(12) United States Patent
Perrin et al.

(10) Patent No.: US 9,016,141 B2
(45) Date of Patent: Apr. 28, 2015

(54) DRY PRESSURE COMPENSATED SENSOR

(71) Applicants: Cedric Perrin, Forcelles Saint Gorgon (FR); Christopher C. Bogath, Gloucestershire (GB)

(72) Inventors: Cedric Perrin, Forcelles Saint Gorgon (FR); Christopher C. Bogath, Gloucestershire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/645,462

(22) Filed: Oct. 4, 2012

(65) Prior Publication Data

US 2014/0096620 A1 Apr. 10, 2014

(51) Int. Cl.
*G01L 5/16* (2006.01)
*G01L 1/26* (2006.01)

(52) U.S. Cl.
CPC .. *G01L 1/26* (2013.01); *G01L 5/161* (2013.01)

(58) Field of Classification Search
USPC .......................................... 73/862.06, 152.49
See application file for complete search history.

(56) References Cited

U.S. PATENT DOCUMENTS

| | | | | |
|---|---|---|---|---|
| 4,359,898 A | * | 11/1982 | Tanguy et al. | 73/152.48 |
| 4,608,861 A | * | 9/1986 | Wachtler et al. | 73/152.48 |
| 4,811,597 A | * | 3/1989 | Hebel | 73/152.48 |
| 4,821,563 A | * | 4/1989 | Maron | 73/152.48 |
| 7,151,254 B2 | * | 12/2006 | Mickael | 250/269.3 |
| 7,775,099 B2 | | 8/2010 | Bogath et al. | |
| 2012/0211220 A1 | * | 8/2012 | Ghazi-Moradi et al. | 166/105 |

* cited by examiner

*Primary Examiner* — Lisa Caputo
*Assistant Examiner* — Octavia Hollington
(74) *Attorney, Agent, or Firm* — Chadwick A. Sullivan; Wesley Noah

(57) ABSTRACT

A pressure compensated sensor assembly for determining loads near a drill bit may include a body member having an inner diameter and an outer diameter, a sleeve member having an inner diameter and an outer diameter, the sleeve member being coupled to the body member, a first gap having a thickness and a length dimension formed between the body member and the sleeve member, and one or more sensors coupled to the sleeve member. The one or more sensors may measure axial and torsional loads on the sleeve member without measuring parasitic strain induced on the body member.

10 Claims, 10 Drawing Sheets

DRY PRESSURE COMPENSATED SENSOR

BACKGROUND

Drilling operators need a reliable way to measure weight-on-bit (WOB) and torque-on-bit (TOB) near a drill bit in a downhole environment. WOB and TOB may be determined from strain and shear measurements near the drill bit. However, pressure differentials in the downhole environment may induce parasitic loads (such as radial forces, axial forces, and hoop strains) on drilling members, thereby inhibiting the ability to isolate the loads associated with WOB and TOB. In some cases, these parasitic loads may be multiple times greater than the WOB and TOB measurements.

SUMMARY

Embodiments of the present disclosure generally provide a pressure compensated sensor assembly for determining loads near a drill bit. The pressure compensated sensor assembly may include a body member coupled to a sleeve member, a gap formed between the body member and the sleeve member, and one or more sensors coupled to the sleeve member. The sensors may measure axial and torsional loads on the sleeve member without measuring parasitic strain induced on the body member. Other embodiments of the present disclosure generally provide a pressure compensated sensor assembly that may include a collar coupled to a body member, a gap formed between the collar and the body member, and one or more sensors coupled to a chosen surface of the gap. The gap may be dimensioned such that the sensors measure axial and torsional loads on the surface to which the sensors are coupled without measuring parasitic strain induced on the body member and the collar. A thermal barrier may also be coupled to the outer diameter of the collar. Embodiments of the present disclosure also generally provide a pressure compensated sensor assembly that may include a collar with an inner diameter and an outer diameter, a cavity disposed between the inner diameter and the outer diameter of the collar, and one or more sensors coupled to a surface of the cavity. The cavity may be dimensioned such that the one or more sensors measure loads associated with axial and torsional loads on the surface to which the sensors are coupled without measuring parasitic strain induced on the collar.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Certain embodiments of the disclosure will hereafter be described with reference to the accompanying drawings, wherein like reference numerals denote like elements, and.

DETAILED DESCRIPTION

Figure 1:
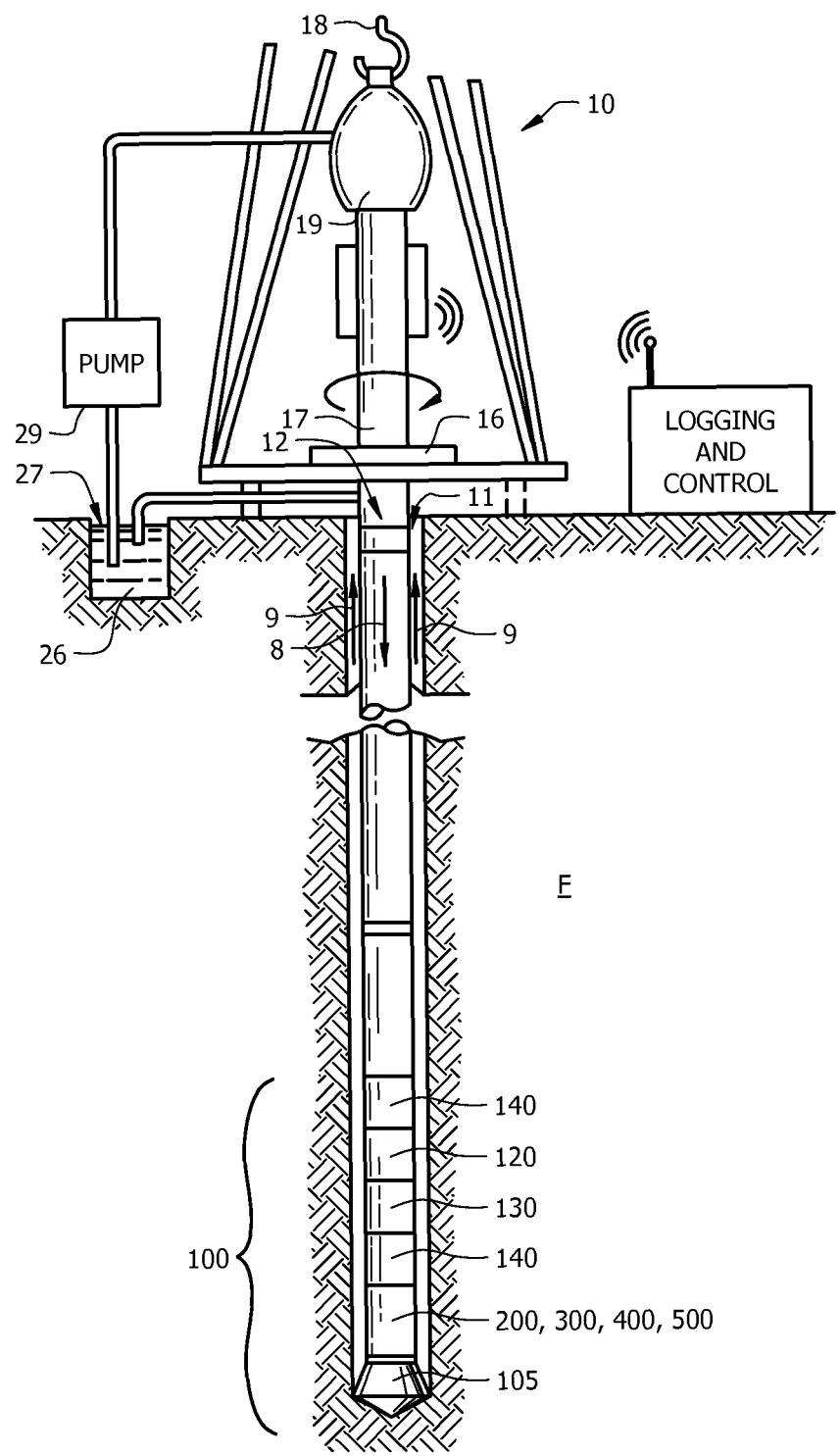
FIG. 1 depicts a side view of an example drilling rig and drilling assembly.

The following disclosure provides many different embodiments, or examples, for implementing different features or aspects of the present disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In the following description, numerous details are set forth to provide an understanding of the present disclosure. However, it will be understood by those of ordinary skill in the art that the present disclosure may be practiced without these details and that numerous variations or modifications from the described embodiments may be possible.

The present disclosure relates generally to downhole drilling sensors, and more particularly, to dry pressure compensated sensor assemblies and methods for sensing downhole WOB and TOB loads near a drill bit. As described herein, the sensor assemblies may compensate for the influence of unrelated parasitic downhole loads. In various embodiments, the sensor assemblies may compensate for parasitic pressure loads without the need for additional parasitic pressure measurements or fluid-filled pressure compensation systems.

FIG. 1 illustrates a well site system in which aspects of the present disclosure may be implemented. The well site can be onshore or offshore. A platform and derrick assembly 10 are positioned over a wellbore 11 penetrating a subterranean formation F. Rotary drilling in a manner that is well known forms the wellbore 11. However, embodiments of the present disclosure can also be employed in directional drilling applications.

A drill string 12 is suspended within the wellbore 11 and has a drilling assembly 100 comprising a drill bit 105 at its lower end. The drilling assembly 100 of the illustrated embodiment comprises one or more dry pressure compensated sensor assemblies 200, 300, 400, 500 according to aspects of the present disclosure, and may comprise other components and structure, such as a logging-while-drilling (LWD) collar module 120 and a measuring-while-drilling (MWD) module 130. Additional components 140 may also be included in the drilling assembly 100.

The platform and derrick assembly 10 includes a rotary table 16, a kelly 17, a hook 18 and a rotary swivel 19. The drill string 12 is rotated by the rotary table 16, energized by means not shown, which engages the kelly 17 at the upper end of the drill string 12. The drill string 12 is suspended from the hook 18, attached to a traveling block (also not shown), through the kelly 17 and the rotary swivel 19, which permits rotation of the drill string 12 relative to the hook 18. A top drive system could alternatively be used.

A drilling fluid 26 is stored in a pit 27 formed at the well site. A pump 29 delivers the drilling fluid 26 to the interior of the drill string 12 via a port in the swivel 19, inducing the drilling fluid 26 to flow downwardly through the interior of the drill string 12 as indicated by the directional arrow 8. The drilling fluid 26 exits the drill string 12 via ports in the drill bit 105, and then circulates upwardly through the annulus region between the outside of the drill string 12 and the wall of the wellbore 11, as indicated by the directional arrows 9. The drilling fluid 26 is referred to as drilling mud when it enters and flows through the annulus region. The drilling fluid 26 lubricates the drill bit 105, and the drilling mud carries formation cuttings up to the surface as it is returned through the annulus region to the pit 27 for recirculation.

During drilling, shear gauges may be used to measure the resultant torsion near the drill bit 105, and such measurements may be used to determine TOB. Likewise, strain gauges may be employed to measure the resultant axial displacement near the drill bit 105, and such measurements may be used to determine WOB. However, parasitic loads may introduce inaccuracies in such determinations of TOB and WOB. For example, as drilling fluid 26 flows downwardly through the interior of the drill string 12, as indicated by directional arrow 8, the drilling fluid 26 may exert a hydrostatic pressure within the drilling assembly 100, which may generally cause components to balloon and shorten. Meanwhile, as drilling mud flows upwardly through the annulus region, as indicated by flow arrows 9, the drilling mud may exert external forces onto the drilling assembly 100, which may generally cause components to narrow and elongate. These internal and external pressures may introduce parasitic loads that cause inaccuracies in the determinations of TOB and WOB.

Existing methods of compensating for these parasitic loads when determining TOB and WOB include a fluid-filled compensation system that physically compensates for local internal and external pressure differences downhole. Generally, internal and external pressures act on separate piston-like mechanisms connected by a fluid-filled cavity therebetween, and the relative positions of the piston-like mechanisms change to equalize the local pressures. Existing methods of compensating for parasitic loads also include employing additional pressure transducers to primarily read the parasitic pressures directly, and then the system mathematically corrects for the effects of the parasitic pressures on component deformation readings near the bit. While these existing methods have proven to be accurate and precise, there are drawbacks. Fluid-filled compensation systems may limit where TOB and WOB measurements may be taken, as many sensors do not function well in fluid environments. In addition, the amount of fluid may need to be adjusted or replaced, thereby requiring periodic maintenance to the system. As such, the compensation system may not be permanently sealed within the drilling assembly. Methods that use additional pressure transducers include more electronic parts, and must be calibrated, thereby increasing complexity, maintenance, and potential for failure.

The present disclosure is directed to dry pressure compensated assemblies 200, 300, 400, 500 that compensate for the effects of downhole pressure differentials on TOB and WOB measurements without requiring fluid-filled pressure compensation systems or additional sensors to read downhole pressures. While embodiments are described in drilling assembly applications, one having ordinary skill in the art will recognize that dry pressure compensated sensor assemblies 200, 300, 400, 500 may be used in other suitable applications. Further, while embodiments are described in drilling assembly applications comprising jointed pipe and rotary drilling, one having ordinary skill in the art will recognize that dry pressure compensated sensor assemblies 200, 300, 400, 500 may be used in other types of downhole applications, such as wireline and coiled tubing applications, for example.

As described more fully herein, FIGS. 2-5 illustrate representative configurations of dry pressure compensated sensor assemblies 200, 300, 400, 500 and parts thereof. It should be understood that the components of dry pressure compensated sensor assemblies 200, 300, 400, 500 and parts thereof shown in FIGS. 2-5 are for illustrative purposes only, and that any other suitable components or subcomponents may be used in conjunction with or in lieu of the components comprising dry pressure compensated sensor assemblies 200, 300, 400, 500 and the parts thereof described herein.

Figure 2A:
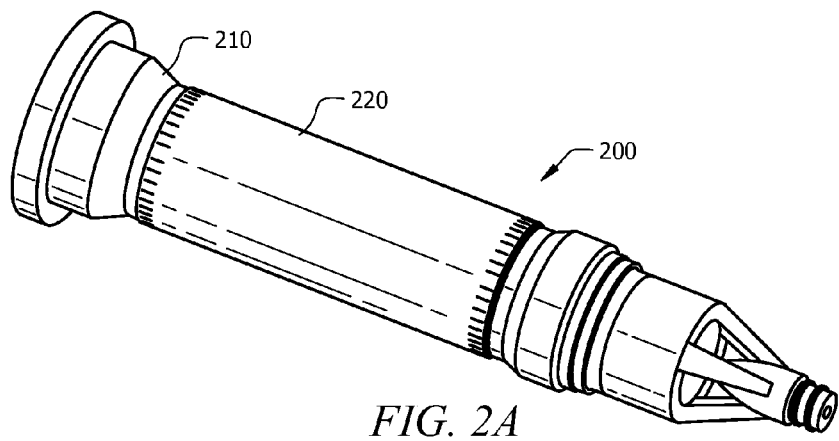
FIG. 2A depicts a perspective view of a dry pressure compensated sensor assembly, according to one or more aspects of the present disclosure.
Figure 2B:
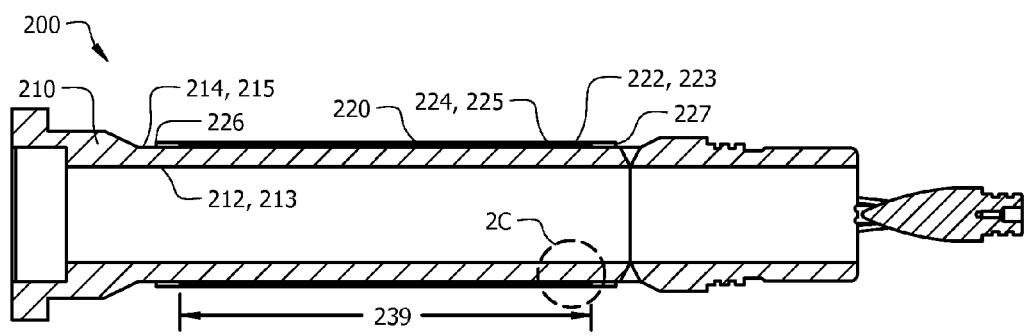
FIG. 2B depicts a side cross-sectional view of the dry pressure compensated sensor assembly of FIG. 2A, according to one or more aspects of the present disclosure.
Figure 2C:
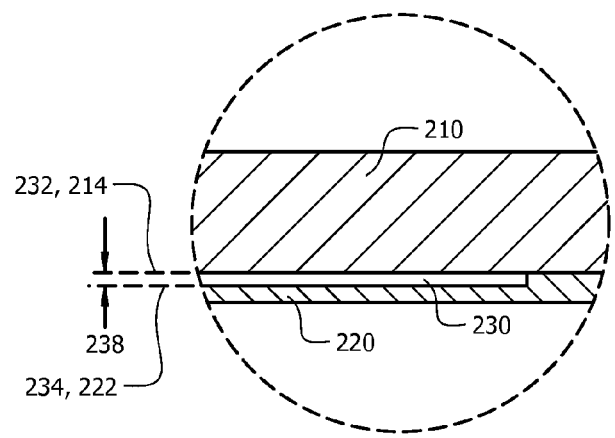
FIG. 2C depicts an enlarged detail view of a gap of the dry pressure compensated sensor assembly of FIG. 2A and FIG. 2B, according to one or more aspects of the present disclosure.
Figure 2D:
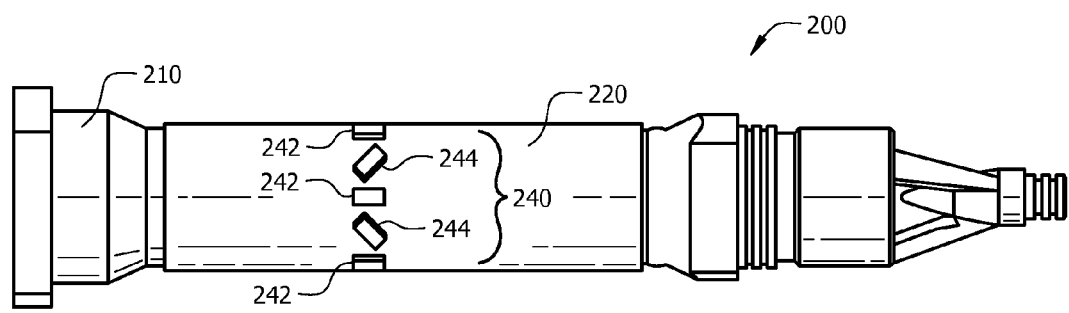
FIG. 2D depicts a side view of the dry pressure compensated sensor assembly of FIGS. 2A-2C, according to one or more aspects of the present disclosure.

FIGS. 2A-2D depict an embodiment of a dry pressure compensated sensor assembly 200, shown in isometric view in FIG. 2A, in cross-sectional view in FIG. 2B, and in side view in FIG. 2D. The dry pressure compensated sensor assembly 200 may generally comprise a body member 210, a sleeve member 220, and one or more sensors 240. FIG. 2C illustrates an enlarged detail view of the portion of dry pressure compensated sensor assembly 200 indicated in FIG. 2B, to depict a gap 230 disposed between body member 210 and sleeve member 220.

Referring now to FIG. 2B, body member 210 may be tubular in shape, and may have an inner diameter 212 and an outer diameter 214, defining an inner surface 213 and an outer surface 215, respectively. Body member 210 may be constructed of any suitable material including, but not limited to, conventional drill collar material, such as non-magnetic stainless steel, non-magnetic austenitic Mn—Cr—N steel commonly referred to as "P550", corrosion resistant non-magnetic austenitic Cr—Ni—N steel commonly referred to as "P750", and other forms of non-magnetic collar material, for example. In an embodiment, inner surface 213 may be treated with a wear-resistant material to provide protection from the erosive effects of drilling fluid that may travel within the inner diameter 212 of body member 210.

Sleeve member 220 may likewise be tubular in shape, and may have an inner diameter 222 and an outer diameter 224, defining an inner surface 223 and an outer surface 225, respectively. Sleeve member 220 may further comprise a first end 226 and a second end 227. Sleeve member 220 may be constructed of any suitable material including, but not limited to, conventional drill collar material, such as non-magnetic stainless steel, non-magnetic austenitic Mn—Cr—N steel commonly referred to as "P550", corrosion resistant non-magnetic austenitic Cr—Ni—N steel commonly referred to as "P750", and other forms of non-magnetic collar material, for example. In an embodiment, at least some properties of the material forming the sleeve member 220 are substantially equal to the corresponding properties of the material forming the body member 210. In an embodiment, the thermal expansion coefficient and the Young's modulus of the materials forming the sleeve member 220 and the body member 210 are substantially equal.

In an embodiment, the inner diameter 222 of sleeve member 220 is larger than the outer diameter 214 of body member 210, thereby enabling sleeve member 220 to be disposed circumferentially about body member 210. In this embodiment, portions of the inner surface 223 of sleeve member 220 may be coupled to the outer surface 215 of body member 210 near ends 226, 227 by any suitable means, such as by welding or brazing, for example. In another embodiment (not shown), the inner diameter 222 of sleeve member 220 is smaller than the inner diameter 212 of body member 210, thereby enabling sleeve member 220 to be disposed within body member 210. In this embodiment, portions of the outer surface 225 of sleeve member 210 may be coupled to the inner surface 213 of body member 210 near ends 226, 227 by any suitable means, such as by welding or brazing, for example. These different configurations allow flexibility to provide a suitable arrangement for a given application.

Referring now to FIG. 2C, the coupling of body member 210 and sleeve member 220 may form a gap 230 between the coupled portions. In embodiments where sleeve member 220 is larger in diameter than body member 210, inner diameter 232 of gap 230 may correspond with outer diameter 214 of body member 210, and outer diameter 234 of gap 230 may correspond with inner diameter 222 of sleeve member 220. Gap 230 may have a thickness 238 and a length 239 (shown in FIG. 2B). Thickness 238 of gap 230 may be sufficient in size to avoid contact between body member 210 and sleeve member 220 under loads encountered in an operating environment. Suitable gap thicknesses 238 may be determined for given applications and for given component materials. Gap 230 may be of any length 239 suitable to avoid significant deformative influence of parasitic pressure on sleeve member 220 when coupled to body member 210. In an embodiment, length 239 is sufficient to ensure that hoop and axial strain induced on body member 210 due to internal and external pressures does not transmit to sleeve member 220 and thereby interfere with the axial strain measurement.

Referring now to FIG. 2D, one or more sensors 240 may be disposed on sleeve member 220. In an embodiment, sensors 240 may comprise one or more strain gauges 242 coupled to sleeve member 220. Strain gauges 242 may be aligned axially to measure axial displacement of sleeve member 220. In an embodiment, multiple strain gauges 242 may be arranged about the circumference of sleeve member 220 at substantially evenly spaced intervals, such as every 90° (one at 0°, 90°, 180°, 270°), for example. In such an arrangement, strain gauges 242 reading opposing axial displacement measurements (e.g. strain gauges at 0° and 180°) may be used to calculate bending deformation. Axial displacement measurements are proportional to WOB, and may be used to calculate WOB.

In another embodiment, sensors 240 may comprise one or more shear gauges 244 coupled to sleeve member 220. Shear gauges 244 may be aligned at an offset from the axial direction, such as at 45° therefrom, to measure torsional deformation of the sleeve member 220. In an embodiment, multiple shear gauges 244 may be arranged about the circumference of sleeve member 220 at substantially evenly spaced intervals, such as every 90° (one at 0°, 90°, 180°, 270°), for example. Torsional deformation measurements are proportional to TOB, and may be used to calculate TOB. The proper type, number, and arrangement of sensors 240 may be determined for any given application.

Dry pressure compensated sensor assembly 200 may compensate for the parasitic effects of hydrostatic pressure within body member 210 on WOB and TOB measurements by effectively isolating sensors 240 deployed from said effects. In operation, hydrostatic pressure within body member 210 (possibly created by the pumping of drilling fluid therethrough) may exert a radial force on body member 210, causing it to deform by ballooning outwardly and shortening. If sensors 240 were disposed on body member 210, sensors 240 may measure both the deformation resulting from hydrostatic pressure and the deformation associated with WOB. However, in various embodiments described above, sensors 240 may be disposed on sleeve member 220 rather than on body member 210. In such a configuration, the gap 230 between body member 210 and sleeve member 220 operates to insulate sensors 240 from axial deformation associated with hydrostatic pressure within body member 210.

Figure 2E:
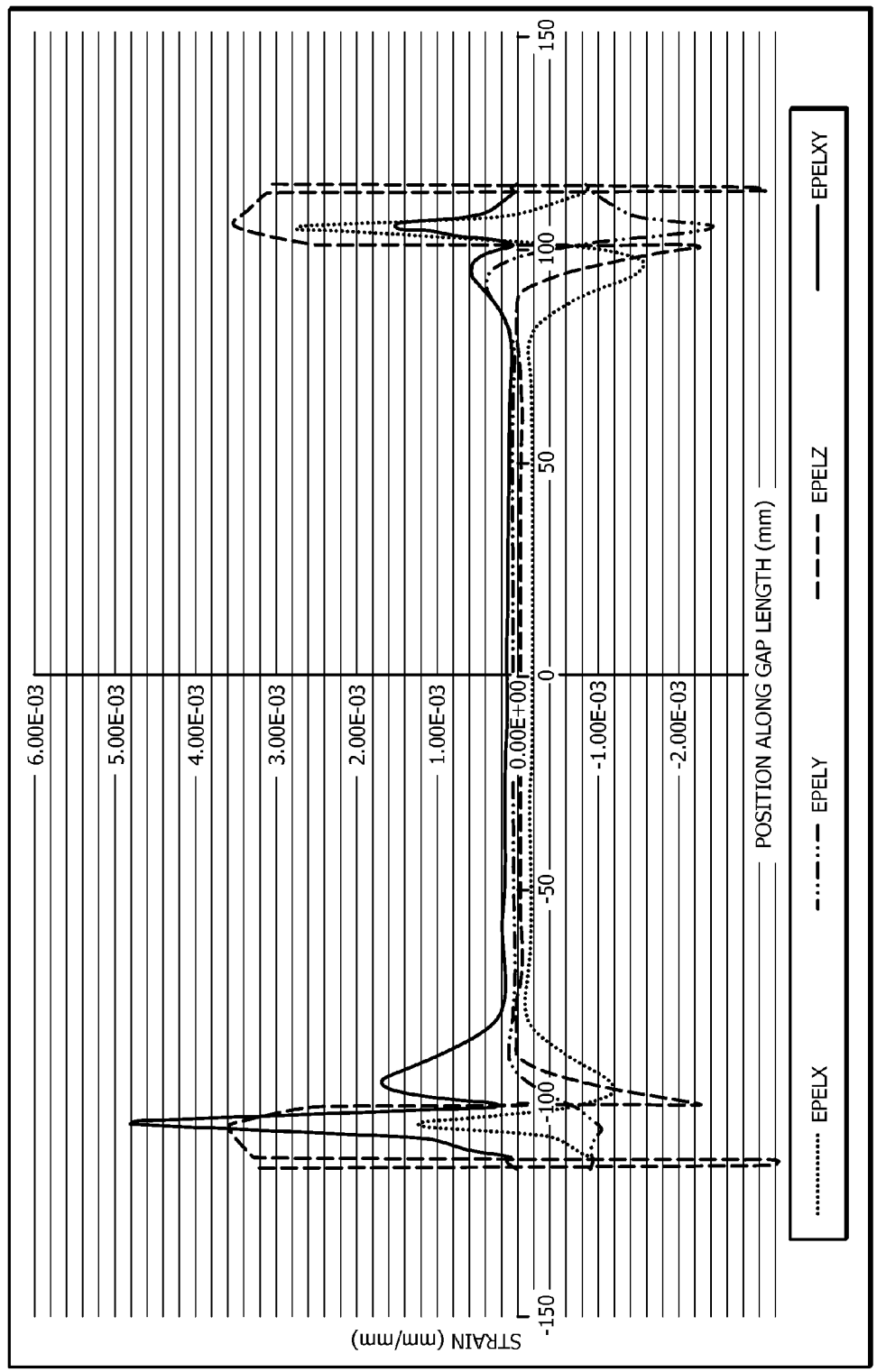
FIG. 2E depicts a graph of strain measurements on a sleeve member versus position along the length of the sleeve member for a variety of applied strains, according to one or more aspects of the present disclosure.

FIG. 2E depicts a graph of strain measurements on a sleeve member 220 versus position along the length of the sleeve member 220 for a variety of applied strains. This experimental data indicates that, in some embodiments, sensors 240 may be most suitably placed substantially near the middle (e.g. ~50%) of the length 239 of the gap 230, as parasitic loads may affect measurements closer to the coupling points near the ends 226, 227 of sleeve member 220.

Figure 2F:
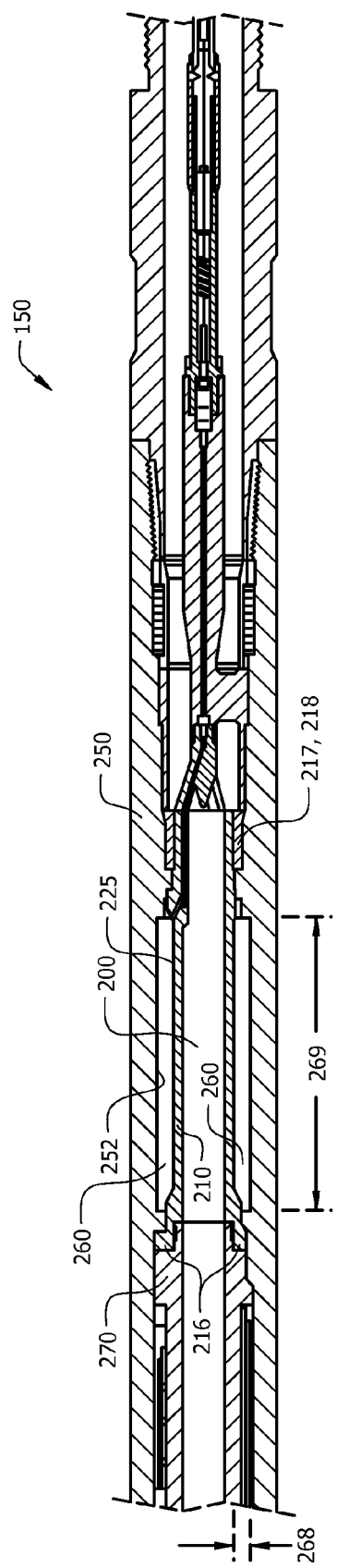
FIG. 2F depicts a side cross-sectional view of the dry pressure compensated sensor assembly of FIGS. 2A-2D disposed within an example drilling assembly, according to one ore more aspects of the present disclosure.

FIG. 2F depicts a cross-sectional view of a drilling assembly 150 comprising dry pressure compensated sensor assembly 200 disposed within a collar 250 and operatively coupled to an electrical chassis 270. In an embodiment, dry pressure compensated sensor assembly 200 may be securely coupled to the collar 250 of drilling assembly 150. In such a configuration, coupling between collar 250 and dry pressure compensated sensor assembly 200, as well as coupling between body member 210 and sleeve member 220 of dry pressure compensated sensor assembly 200 as previously described, combine to ensure that torsion and tensile loads are translated to sleeve member 220, allowing for sensors 240 (not shown) to measure such torsion and tensile loads for TOB calculations.

In an embodiment, dry pressure compensated sensor assembly 200 may couple to collar 250 of drilling assembly 100 via a shoulder-type coupling 216 at one end, and a pretensioned coupling 217 at the opposing end, possibly through the use of a pretensioned mechanism 218, such as a nut keyed into collar 250, a compressed spring-loaded mechanism, or through a pressure locked assembly, for example. Body member 210 may be threaded or keyed (or by similar functional means) at both ends to collar 250 such that torque may be directly transmitted between collar 250 and body member 210.

In the configuration of FIG. 2F, dry pressure compensated sensor assembly 200 may be operable to compensate for parasitic effects of external pressure. In an embodiment, the interface between dry pressure compensated sensor assembly 200 and collar 250 may be constructed to form a gap 260 between the outer surface 225 of sleeve member 220 and the inner surface 252 of collar 250. In an embodiment, the interface between dry pressure compensated sensor assembly 200 and collar 250 would form a similarly structured gap 260 as gap 230 shown in FIG. 2C. The thickness 268 of gap 260 may be sufficient in size to avoid contact between sleeve member 220 and collar 250 under loads encountered in an operating environment. A suitable gap thickness 268 may be determined for a given application and for given component materials. Gap 260 may be of any length 269 suitable to avoid significant deformative influence of parasitic pressure on sleeve member 220 when coupled to collar 250. The electrical chassis 270 may be operatively coupled to dry pressure compensated sensor assembly 200 for processing signals from sensors 240 (not shown).

Figure 3A:
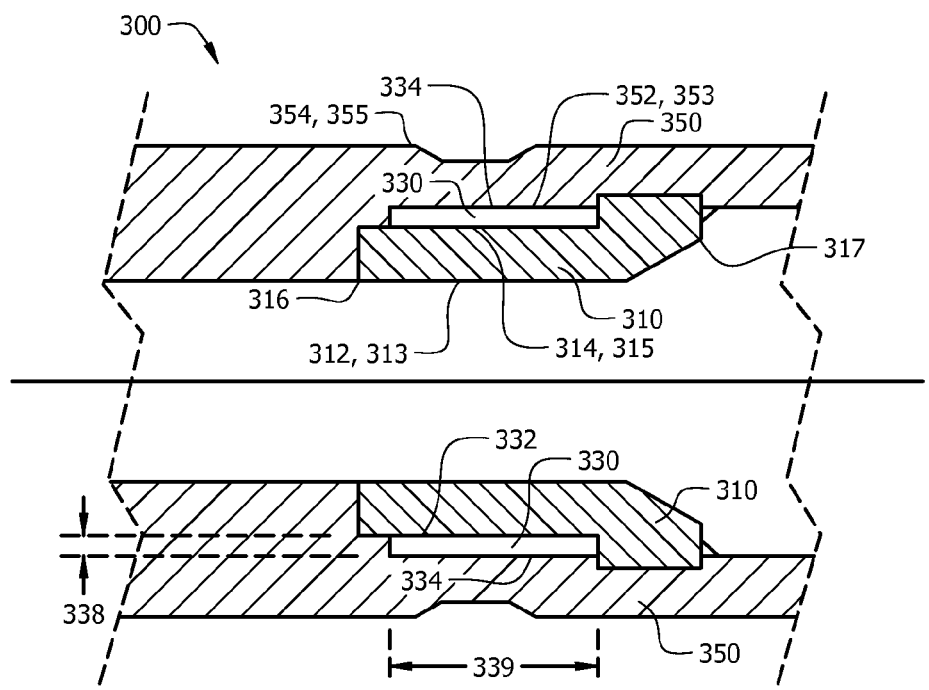
FIG. 3A depicts a side cross-sectional view of a portion of another dry pressure compensated sensor assembly disposed within an example drilling assembly, according to one or more aspects of the present disclosure.

FIG. 3A depicts another embodiment of a dry pressure compensated sensor assembly 300 comprising a body member 310, a gap 330, a collar 350, and one or more sensors (not shown). Body member 310 may be tubular in shape, having ends 316, 317, and an inner diameter 312 and outer diameter 314 defining an inner surface 313 and an outer surface 315, respectively. Body member 310 may be constructed of any suitable material. In an embodiment, inner surface 313 may be treated with a wear-resistant material to provide protection from erosive effects of drilling fluid that may travel within the inner diameter 312 of body member 310.

Collar 350 may comprise any suitable drilling collar. Collar 350 may be generally tubular in shape, and may have an inner diameter 352 and an outer diameter 354 defining an inner surface 353 and an outer surface 355, respectively. Collar 350 may be constructed of any suitable material including, but not limited to, conventional drill collar material, such as non-magnetic stainless steel, non-magnetic austenitic Mn—Cr—N steel commonly referred to as "P550", corrosion resistant non-magnetic austenitic Cr—Ni—N steel commonly referred to as "P750", and other forms of non-magnetic collar material, for example. Body member 310 may be disposed within and coupled to inner diameter 352 of collar 350, forming gap 330 therebetween. Prior to coupling body member 310 to collar 350, sensors (not shown) may be prewired in the area of the gap 330 to outer surface 315 of body member 310 or inner surface 353 of collar 350, in similar configuration and arrangement as previously described with respect to sensors 240. Sensors may be in electrical communication with an electrical chassis (not shown) for processing signals. The proper type, number, and arrangement of sensors may be determined for a given application.

In an embodiment, body member 310 may be substantially permanently coupled to inner diameter 352 of collar 350 by any suitable means, such as by welding or brazing, for example. In substantially permanently coupled embodiments, the weld or braze ensures that body member 310 maintains relative position, orientation and substantially constant positive contact with collar 350, even in maximum compression conditions. In another embodiment, body member 310 may be removably coupled to inner diameter 352 of collar 350 by any suitable means, such as by threaded connection, for example. Removably coupled embodiments may comprise a pretensioned assembly in which body member 310 is pretensioned within collar 350 such that body member 310 maintains relative position, orientation, and substantially constant positive contact with collar 350, even in maximum compression conditions. In such pretensioned assemblies, the body member 310 may be formed of a low Young's modulus material, such as titanium alloy. Such an arrangement may minimize measurement hysteresis and improve repeatability and reliability of measurement results. In an embodiment, an interface between body member 310 and collar 350 may be achieved via a shoulder-type coupling at end 316, and a pretensioned coupling at end 317. Body member 310 may be keyed (or by similar functional means) at both ends to collar 350 such that torque may be directly transmitted between collar 350 and body member 310.

Collar 350 and body member 310 may be shaped and coupled such that a gap 330 may be formed therebetween. Gap 330 may have an inner diameter 332, an outer diameter 334, a thickness 338, and a length 339. Inner diameter 332 of gap 330 may correspond with outer diameter 314 of body member 310, and outer diameter 334 of gap 330 may correspond with inner diameter 352 of collar 350. Thickness 338 of gap 330 may be sufficient in size to avoid contact between body member 310 and collar 350 therein under loads encountered in an operating environment, and may also be large enough to accommodate sensors, wiring, and other components disposed on outer surface 315 of body member 310 or inner surface 353 of collar 350 therein. A suitable gap thickness 338 may be determined for a given application and for given component materials.

Figure 3B:
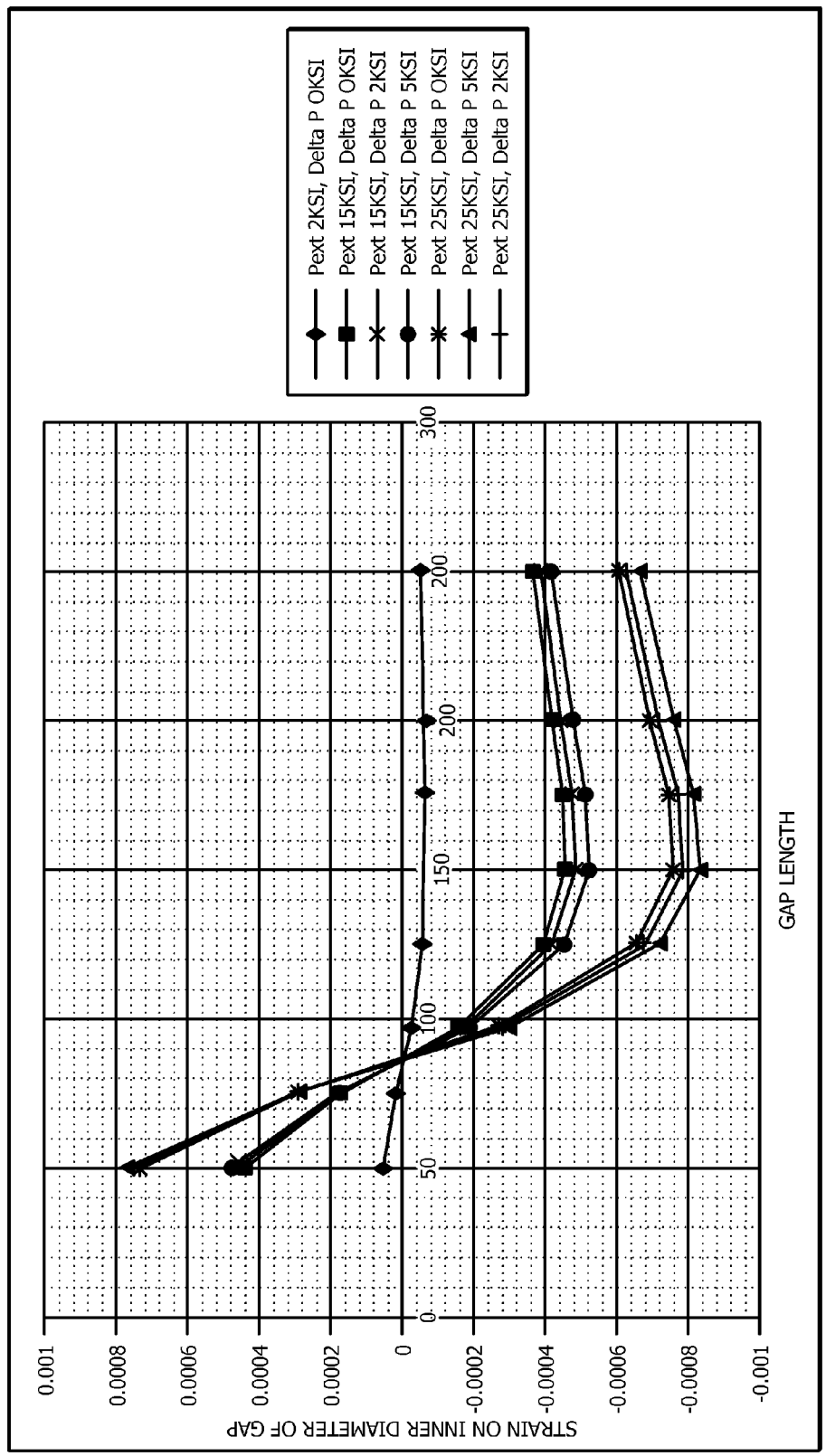
FIG. 3B depicts a graph of strain measurements on a surface of an inner diameter of a gap versus the length of the gap for a variety of applied pressures and pressure differentials, according to one or more aspects of the present disclosure.

Gap 330 may be of any length 339 suitable to minimize the deformative effects of parasitic strain on a predetermined surface of gap 330 encountered in an operating environment. In an embodiment, the gap length 339 may be determined by measuring axial strain on a predetermined surface of gap 330 under various different pressure/pressure differential combinations, and then selecting a gap length 339 for which strain is minimized. For example, FIG. 3B depicts a graph of strain measurements on the inner diameter 332 of gap 330, corresponding to the outer surface 315 of body member 310, versus gap length for a variety of applied pressures and pressure differentials. According to the graph depicted in FIG. 3B, a gap length 339 of approximately 87 mm may be selected to minimize axial strain induced by the pressure effect.

Figure 3C:
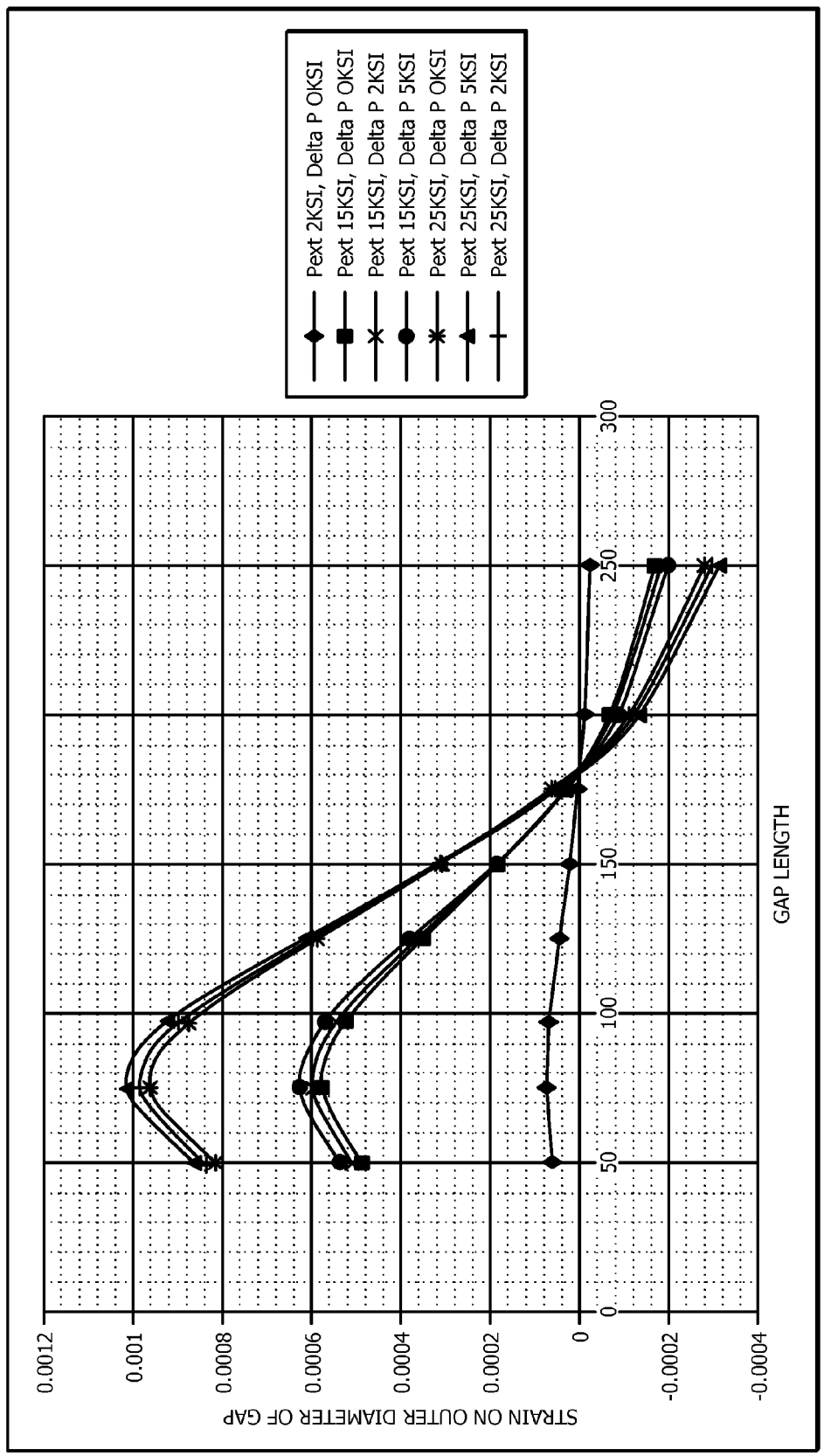
FIG. 3C depicts a graph of strain measurements on a surface of an outer diameter of a gap versus the length of the gap for a variety of applied pressures and pressure differentials, according to one or more aspects of the present disclosure.

Similarly, FIG. 3C depicts a graph of strain measurements on the outer diameter 334 of gap 330, corresponding to the inner surface 353 of collar 350, versus gap length for a variety of applied pressures and pressure differentials. According to the graph depicted in FIG. 3C, a gap length 339 of approximately 180 mm may be selected to minimize axial strain induced by the hydrostatic pressure and the pressure differential.

Dry pressure compensated sensor assembly 300 may be used to effectively "cancel out" strains in both directions, and thereby compensate for parasitic strain effects on a chosen surface 315, 353 within gap 330. Therefore, sensors coupled to said chosen surface 315, 353 may measure deformation associated with WOB and TOB substantially free of the aforementioned parasitic effects. In operation, internal hydrostatic pressure (possibly created by the pumping of drilling fluid through sensor assembly 300) may exert a radial force on body member 310, causing it to deform, perhaps by ballooning and shortening. External pressures may exert an opposite radial force on collar 350, causing it to deform, perhaps by narrowing and elongating. A properly sized gap 330 between body member 310 and collar 350 may combine the parasitic strains in both directions, and minimize their effect on a predetermined surface 315, 353 within gap 330 where sensors may be placed.

In an embodiment, the dry pressure compensated sensor assembly 300 of FIG. 3A, which compensates for axial strain, may be combined with the dry pressure compensated sensor assembly 200 of FIGS. 2A-2D, which compensates for Hoop strain. For example, the dry pressure compensated sensor assembly 200 may be disposed within the dry pressure compensated sensor assembly 300.

Figure 4:
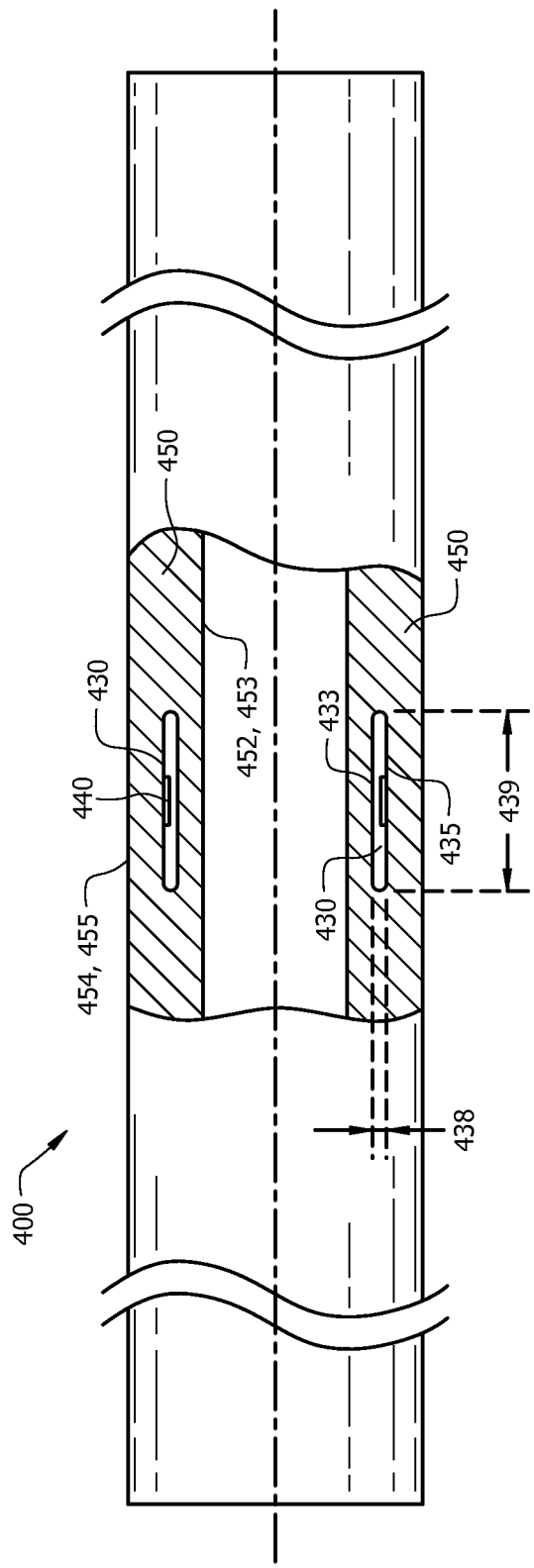
FIG. 4 depicts a side cross-sectional view of another dry pressure compensated sensor assembly disposed in an example drilling assembly, according to one or more aspects of the present disclosure.

FIG. 4 depicts another embodiment of a dry pressure compensated sensor assembly 400 that generally comprises a collar 450, a cavity 430, and one or more sensors 440. Collar 450 may be generally tubular in shape, and may have an inner diameter 452 and an outer diameter 454 defining an inner surface 453 and an outer surface 455, respectively. Collar 450 may be constructed of any suitable material including, but not limited to, conventional drill collar material, such as non-magnetic stainless steel, non-magnetic austenitic Mn—Cr—N steel commonly referred to as "P550", corrosion resistant non-magnetic austenitic Cr—Ni—N steel commonly referred to as "P750", and other forms of non-magnetic collar material, for example. In an embodiment, inner surface 453 may be treated with a wear-resistant material to provide protection from erosive effects of drilling fluid that may travel within the inner diameter 452 of collar 450.

Collar 450 may further comprise a cavity 430 disposed between inner surface 453 and outer surface 455. Cavity 430 may have an inner surface 433 and an outer surface 435, a thickness 438 and a length 439. Thickness 438 of cavity 430 may be sufficient in size to avoid contact between inner surface 433 and outer surface 435 therein under loads encountered in an operating environment, and may also be large enough to accommodate sensors 440, wiring, and other components disposed therein. A suitable cavity thickness 438 may be determined for a given application and for given component materials.

Cavity 430 may be of any length 439 suitable to minimize the deformative effects of parasitic strain on a predetermined surface of cavity 430 encountered in an operating environment. In an embodiment, length 439 may be determined by measuring axial strain on a predetermined surface 433, 435 of cavity 430 under a variety of pressure/pressure differential combinations, and then selecting a cavity length 439 for which strain is minimized. An appropriate cavity length 439 for a given cavity surface 433 or 435 may be determined in a similar manner as in sensor assembly 300.

Dry pressure compensated sensor assembly 400 may effectively "cancel out" strains in both directions, and thereby compensate for parasitic strain effects on a chosen surface 433, 435 within cavity 430. Sensors 440 coupled to said surface 433 or 435 may measure deformation associated with WOB and TOB substantially free of the aforementioned parasitic effects. In operation, internal hydrostatic pressure (possibly created by the pumping of drilling fluid through sensor assembly 400) may exert a radial force on collar 450, causing it to deform, perhaps by ballooning and shortening. External pressures may exert an opposite radial force on collar 450, causing it to deform, perhaps by narrowing and elongating. A properly sized cavity 430 between inner and outer surfaces 453 and 455 of collar 450, respectively, may combine the parasitic strains in both directions, and minimize their effect on a predetermined surface 433, 435 of the cavity 430 where sensors 440 may be placed. Sensors 440 may be in electrical communication with an electrical chassis (not shown) for processing signals. The proper type, number, and arrangement of sensors 440 may be determined for a given application.

In an embodiment, the dry pressure compensated sensor assembly 400 of FIG. 4, which compensates for axial strain, may be combined with the dry pressure compensated sensor assembly 200 of FIGS. 2A-2D, which compensates for Hoop strain. For example, the dry pressure compensated sensor assembly 200 may be disposed within the dry pressure compensated sensor assembly 400.

Figure 5:
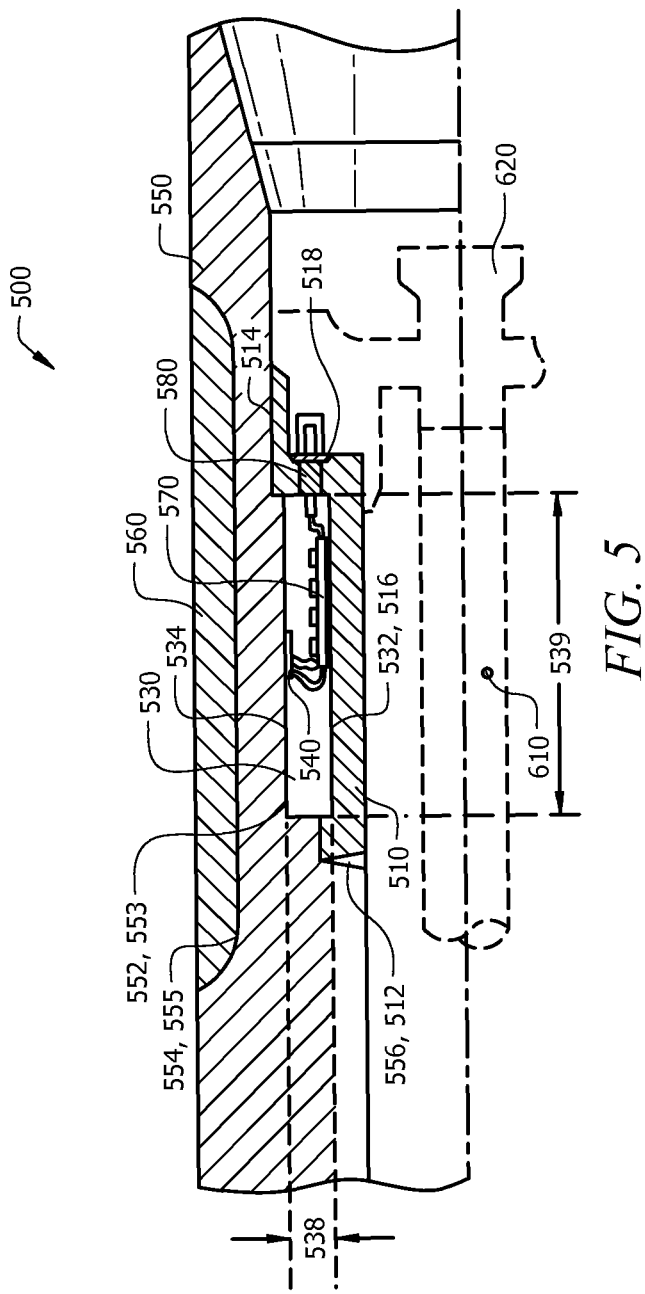
FIG. 5 depicts a side cross-sectional view of yet another dry pressure compensated sensor assembly, according to one or more aspects of the present disclosure.

FIG. 5 depicts a cross-sectional view of yet another embodiment of a dry pressure compensated sensor assembly 500 comprising a collar 550, a thermal barrier 560, a body member 510, a gap 530, and one or more sensors 540 operatively coupled to an electrical chassis 570.

Collar 550 may comprise any suitable drilling collar. Collar 550 may be constructed of any suitable material including, but not limited to, conventional drill collar material, such as non-magnetic stainless steel (Cr—Mn or Cr—Ni), for example. Collar 550 may be generally tubular in shape, and may have a reduced wall thickness generally in an area where the one or more sensors 540 will be placed. The reduced wall thickness of collar 550 comprises a reduced inner diameter 552 and a reduced outer diameter 554 defining an inner surface 553 and an outer surface 555, respectively.

Body member 510 may be disposed within and coupled to a shoulder 556 of collar 550 on a first end 512 of body member 510, and coupled to the inner surface 553 of collar 550 on a second end 514 of body member 510, forming gap 530 therebetween. In an embodiment, body member 510 may be substantially permanently coupled to collar 550 by any suitable means, such as by welding or brazing, for example, to provide a mechanical joint and sealing between body member 510 and collar 550.

Gap 530 may have an inner diameter 532, an outer diameter 534, a thickness 538, and a length 539. Inner diameter 532 of gap 530 may correspond with a top surface 516 of body member 510, and outer diameter 534 of gap 530 may correspond with reduced inner diameter 552 of collar 550. Thickness 538 of gap 530 may be sufficient in size to avoid contact between body member 510 and collar 550 therein under loads encountered in an operating environment, and may also be large enough to accommodate sensors 540, electrical chassis 570, wiring, and other components disposed on upper surface 516 of body member 510 or inner surface 553 of collar 550 therein. A suitable gap thickness 538 may be determined for a given application and for given component materials.

Gap 530 may be of any length 539 suitable to minimize the deformative effects of parasitic strain on a predetermined surface of gap 530 encountered in an operating environment. In an embodiment, the gap length 539 may be determined by measuring axial strain on a predetermined surface of gap 530 under various different pressure/pressure differential combinations, and then selecting a gap length 539 for which strain is minimized.

Prior to coupling body member 510 to collar 550, sensors 540, such as strain gauges, for example, may be prewired in the area of the gap 530 to inner surface 553 of collar 550 to transmit the loads on the collar 550 to the sensors 540. The reduced wall thickness of collar 550 in the area of the sensors 540 serves to increase the sensitivity to WOB measurements by the sensors 540, and outer surface 555 of collar 550 also provides space for coupling a thermal barrier 560. The thermal barrier 560 may comprise any suitable material to limit the effects of radial thermal conductivity or an antenna on the load measurements taken by sensors 540. In an embodiment, thermal barrier 560 comprises rubber.

Sensors 540 may be in electrical communication with an electrical chassis 570 for processing signals. The electrical chassis 570 may be placed within the gap 530 and coupled to either the top surface 516 of body member 510 as depicted in FIG. 5, or coupled to the inner surface 553 of the collar 550 adjacent the sensors 540. The proper type, number, and arrangement of sensors 540 may be determined for a given application.

In an embodiment, feedthrough components 580 may extend through a wall 518 of the body member 510 and be coupled to the body member 510 by any suitable means, such as by welding or brazing. Feedthrough components 580 may be operatively coupled to the electronics chassis 570 to convey signals from the sensors 540 to one or more other electronics modules 610 in the drilling assembly, or to another tool in the drilling assembly via a flow diverter 620.

In an embodiment, the dry pressure compensated sensor assembly 500 of FIG. 5, which compensates for axial strain, may be combined with the dry pressure compensated sensor assembly 200 of FIGS. 2A-2D, which compensates for Hoop strain. For example, the dry pressure compensated sensor assembly 200 may be disposed within the dry pressure compensated sensor assembly 500.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

The invention claimed is:

1. A pressure compensated sensor assembly for determining loads near a drill bit, the pressure compensated sensor assembly having an interior configured to receive drilling fluid and an exterior, the pressure compensated sensor assembly comprising:
   a body member having an inner diameter and an outer diameter;
   a sleeve member having an inner diameter and an outer diameter, the sleeve member coupled to the body member;
   a gap defined between the body member and the sleeve member; and
   one or more sensors coupled to at least one of the sleeve member or the body member on the exterior of the pressure compensated sensor assembly;
   wherein the one or more sensors are configured to measure at least one of axial or torsional loads on the pressure compensated sensor assembly.

2. The pressure compensated sensor assembly according to claim 1, wherein the inner diameter of the sleeve member is larger than the outer diameter of the body member.

3. The pressure compensated sensor assembly according to claim 1, wherein the outer diameter of the sleeve member is smaller than the inner diameter of the body member.

4. The pressure compensated sensor assembly according to claim 1, wherein the sleeve member has a length and each of the one or more sensors is positioned proximate to the middle of the length of the sleeve member.

5. The pressure compensated sensor assembly according to claim 1, further comprising a collar having an inner diameter and an outer diameter, wherein the body member and the sleeve member are disposed within and coupled to the collar, and a second gap is defined between the body member and the sleeve member, and the inner diameter of the collar, and the one or more sensors are disposed in the second gap.

6. The pressure compensated sensor assembly according to claim 5, wherein the body member and the sleeve member are non-rotationally coupled to the collar such that torsional loads are transferred between the collar, the body member, and the sleeve member.

7. The pressure compensated sensor assembly according to claim 5, further comprising a third gap at least partially defined by the collar, the third gap disposed between an interior of the collar and an exterior of the collar, the third gap comprising a first surface proximate to the exterior of the collar and a second surface proximate to the interior of the collar; and a second set of one or more sensors coupled to at least one of the first surface of the third gap or the second surface of the third gap, the second set of one or more sensors configured to measure at least one of axial or torsional loads on the at least one of the first surface or the second surface to which the one or more sensors are coupled.

8. The pressure compensated sensor assembly according to claim 7, wherein the third gap comprises a cavity defined between an inner surface and an outer surface of the collar.

9. The pressure compensated sensor assembly according to claim 7, further comprising a second body member coupled with the collar, the third gap defined between the second body member and the collar.

10. The pressure compensated sensor assembly according to claim 1, wherein the sleeve member is non-rotationally coupled to the body member such that torsional loads are transferred between the sleeve member and the body member.

* * * * *